US010128785B1

(12) United States Patent
Stitt et al.

(10) Patent No.: US 10,128,785 B1
(45) Date of Patent: Nov. 13, 2018

(54) SYSTEMS AND METHODS FOR MITIGATING TRANSIENT EVENTS IN A POWER GENERATION SYSTEM

(71) Applicant: General Electric Company, Schenectady, NY (US)

(72) Inventors: Jametra Stitt, Houston, TX (US); Timothy LeBlanc, Houston, TX (US); Edward Benya, Houston, TX (US); Tabrez Shakeel, Houston, TX (US); William Adams, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/601,322

(22) Filed: May 22, 2017

(51) Int. Cl.
*H02P 11/00* (2006.01)
*H02H 7/06* (2006.01)
*H02P 9/00* (2006.01)
*H02P 9/10* (2006.01)
*H02J 3/24* (2006.01)
*H02J 7/16* (2006.01)
*F01D 15/10* (2006.01)
*G05B 15/02* (2006.01)
*H02P 3/00* (2006.01)

(52) U.S. Cl.
CPC ............. *H02P 9/102* (2013.01); *F01D 15/10* (2013.01); *G05B 15/02* (2013.01); *H02J 3/24* (2013.01); *H02J 7/163* (2013.01)

(58) Field of Classification Search
USPC ............ 322/10, 25, 28; 363/162; 415/15, 17
See application file for complete search history.

(56) References Cited

U.S. PATENT DOCUMENTS

| | | | | |
|---|---|---|---|---|
| 3,148,324 A | * | 9/1964 | Peaslee | H02M 5/272 363/162 |
| 3,233,412 A | * | 2/1966 | Wagner | F01K 7/345 415/15 |
| 3,233,413 A | * | 2/1966 | Wagner | H02P 23/16 415/10 |
| 3,400,321 A | * | 9/1968 | Lafuze | H02H 7/1216 361/18 |
| RE26,630 E | * | 7/1969 | Peaslee | H02M 5/272 322/29 |
| 3,641,418 A | * | 2/1972 | Plette | H02H 3/207 307/151 |

(Continued)

*Primary Examiner* — Pedro J Cuevas
(74) *Attorney, Agent, or Firm* — Eversheds-Sutherland (US) LLP

(57) ABSTRACT

Embodiments of the disclosure relate to transient event mitigating systems and methods that can be incorporated into a power generation system. The power generation system can include an exciter coupled to an alternating current (AC) generator that provides electric power to power lines. The transient event mitigating system can include an automatic voltage regulator that detects a transient event in one or more of the power lines and configures a power converter to respond to the transient event by increasing an amount of direct current (DC) voltage coupled into the power converter. The power converter can provide the increased DC voltage to an exciter coil of the exciter for a transitory period of time in order to adjust the electric power generated by the AC generator and mitigate adverse effects of the transient event.

20 Claims, 4 Drawing Sheets

(56) References Cited

U.S. PATENT DOCUMENTS

| | | | | |
|---|---|---|---|---|
| 3,889,106 | A * | 6/1975 | Alliston | G09B 9/00 376/217 |
| 4,947,100 | A * | 8/1990 | Dhyanchand | F02N 11/04 290/38 R |
| 4,992,721 | A * | 2/1991 | Latos | F02N 11/04 290/38 R |
| 5,015,941 | A * | 5/1991 | Dhyanchand | F02N 11/04 290/38 R |
| 5,027,265 | A * | 6/1991 | Dhyanchand | H02M 7/49 322/28 |
| 5,031,086 | A * | 7/1991 | Dhyanchand | H02M 7/49 322/28 |
| 5,097,195 | A * | 3/1992 | Raad | F02N 11/04 290/38 R |
| 5,117,174 | A * | 5/1992 | Kessler | H02P 9/30 322/21 |
| 5,225,973 | A * | 7/1993 | Patel | H02M 7/49 322/28 |
| 5,493,200 | A * | 2/1996 | Rozman | H02P 9/08 322/10 |
| 5,512,811 | A * | 4/1996 | Latos | F02N 11/04 318/400.13 |
| 5,594,322 | A * | 1/1997 | Rozman | F02N 11/04 318/400.12 |
| 7,508,086 | B2 * | 3/2009 | Huang | F02N 11/04 290/31 |
| 7,692,325 | B2 * | 4/2010 | Ichinose | H02J 3/18 290/43 |
| 7,821,145 | B2 * | 10/2010 | Huang | F02N 11/04 290/31 |
| 8,198,872 | B2 | 6/2012 | Xu et al. | |
| 8,358,111 | B2 | 1/2013 | Rozman et al. | |
| 8,427,092 | B2 | 4/2013 | Rozman et al. | |
| 8,536,816 | B2 | 9/2013 | Fish | |
| 8,975,876 | B2 * | 3/2015 | Rozman | H02P 9/305 322/28 |
| 9,252,695 | B2 | 2/2016 | Benya, Jr. et al. | |
| 9,270,219 | B2 | 2/2016 | Lando et al. | |
| 9,325,229 | B2 | 4/2016 | Rozman et al. | |
| 2007/0222220 | A1 * | 9/2007 | Huang | F02N 11/04 290/31 |
| 2009/0174188 | A1 * | 7/2009 | Huang | F02N 11/04 290/46 |
| 2014/0266079 | A1 * | 9/2014 | Rozman | H02P 9/02 322/28 |

\* cited by examiner

SYSTEMS AND METHODS FOR MITIGATING TRANSIENT EVENTS IN A POWER GENERATION SYSTEM

FIELD OF THE DISCLOSURE

This disclosure generally relates to power generation systems, and more particularly, to systems and methods for mitigating transient events in a power generation system.

BACKGROUND OF THE DISCLOSURE

An electric power generation system typically includes a power plant for generating electricity that is provided to various customers via an electric grid. The amount of electricity that is consumed by the customers not only depends on the type of the customer (residential customer, industrial customer, commercial customer, etc.) but on the nature of the equipment that is coupled to the electric grid as well. An industrial customer, for example, may have one or more large motors that are subjected to varying loads. The motors may accordingly draw a large amount of electricity from the electric grid at some times and then reduce consumption at other times. A residential customer may use lights during the evening hours and turn off these lights later at night. The electric power generation system has to not only take into consideration such variations in power consumption but has to also be designed to withstand transient power conditions that may be introduced into the electric grid as a result of relatively abrupt changes in power usage.

The transient power conditions generally last for a short period of time and create large voltage spikes that can cause harm to equipment if left unaddressed. Various traditional electric power generation systems incorporate safeguards to provide protection against such transients, with varying levels of effectiveness. Some fail to react fast enough to be effective, while some others fail to dampen the transient voltages to a desired level.

BRIEF DESCRIPTION OF THE DISCLOSURE

Embodiments of the disclosure are directed generally to transient event mitigating systems and methods that can be incorporated into a power generation system.

According to one exemplary embodiment of the disclosure, a system can include an alternating current generator, a primary direct current voltage source, a secondary direct current voltage source, a switch, an automatic voltage regulator, and a power converter. The alternating current generator can include an exciter with an exciter coil and can be configured to provide power to one or more power lines. The switch can have a default configuration during which a first output terminal of the primary direct current voltage source is coupled to a ground node via the switch, and an operative configuration during which the secondary direct current voltage source is coupled in series with the primary direct current voltage source to the ground node via the switch. The automatic voltage regulator can be configured to detect a transient event occurring on the one or more power lines, and can be further configured to generate at least one control signal that places the switch in the operative configuration for a transitory period of time, the transitory period of time defined at least in part by a duration of the transient event. The power converter can be configured to couple to the exciter coil, at least one of a first direct current voltage that is provided by the primary direct current voltage source, or a second direct current voltage that is provided by a combination of the primary direct current voltage source coupled in series with the secondary direct current voltage source during the transitory period of time.

According to another exemplary embodiment of the disclosure, a method can include using an alternating current generator to provide power to one or more power lines, the alternating current generator comprising an exciter with an exciter coil; coupling to the exciter coil, an excitation voltage provided by a primary direct current voltage source; detecting a transient event occurring on the one more power lines; and boosting the excitation voltage for a transitory period of time by coupling a secondary direct current voltage source in series with the primary direct current voltage source, the transitory period of time defined at least in part by a duration of the transient event.

According to yet another exemplary embodiment of the disclosure, a non-transitory computer-readable storage medium can include instructions executable by at least one processor for performing operations that can include detecting a transient event occurring in one or more power lines, the one or more power lines powered by an alternating current generator that includes an exciter with an exciter coil, the exciter coil provided an excitation voltage by a primary direct current voltage source; generating at least one control signal upon detecting the transient event; and boosting the excitation voltage for a transitory period of time by using the at least one control signal to activate a switch and couple a secondary direct current voltage source in series with the primary direct current voltage source.

Other embodiments and aspects of the disclosure will become apparent from the following description taken in conjunction with the following drawings.

BRIEF DESCRIPTION OF THE DRAWINGS

Figure 1:
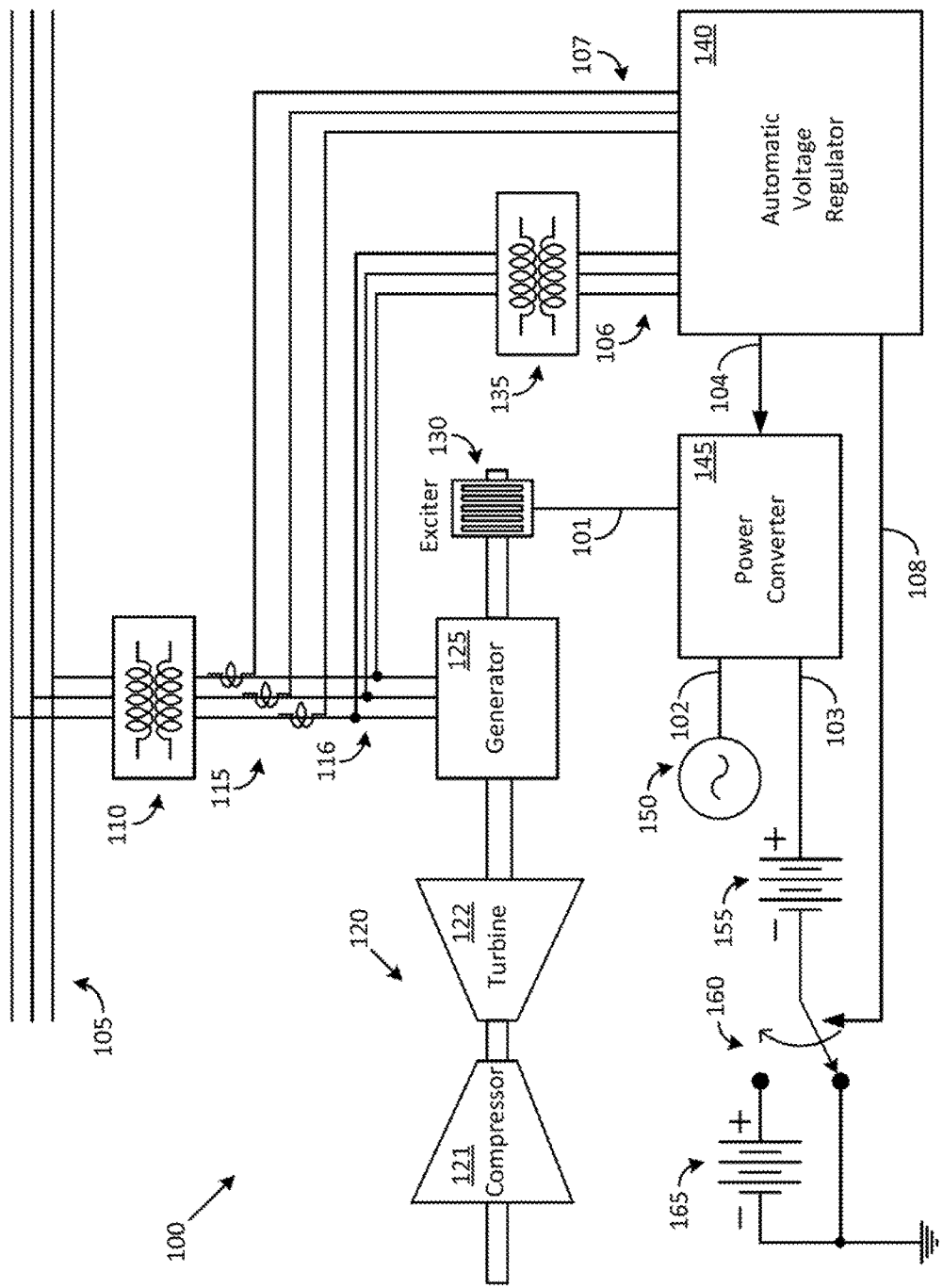

Having thus described the disclosure in general terms, reference will now be made to the accompanying drawings, which are not necessarily drawn to scale, and wherein:

FIG. 1 illustrates a power generation system that incorporates a transient event mitigating system in accordance with an exemplary embodiment of the disclosure.

Figure 2:
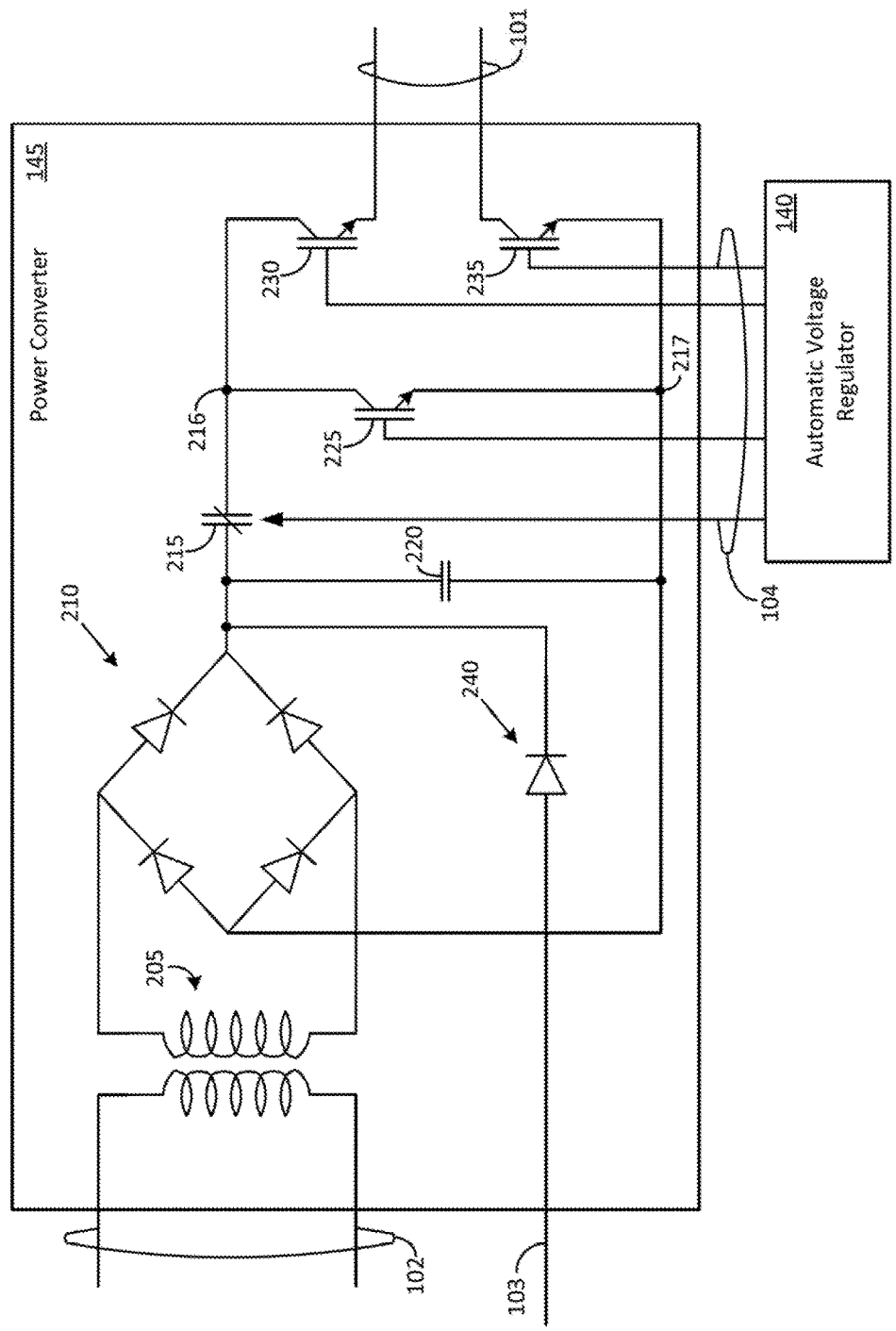

FIG. 2 illustrates some example components of a power converter that can be included in a transient event mitigating system in accordance with an exemplary embodiment of the disclosure.

Figure 3:
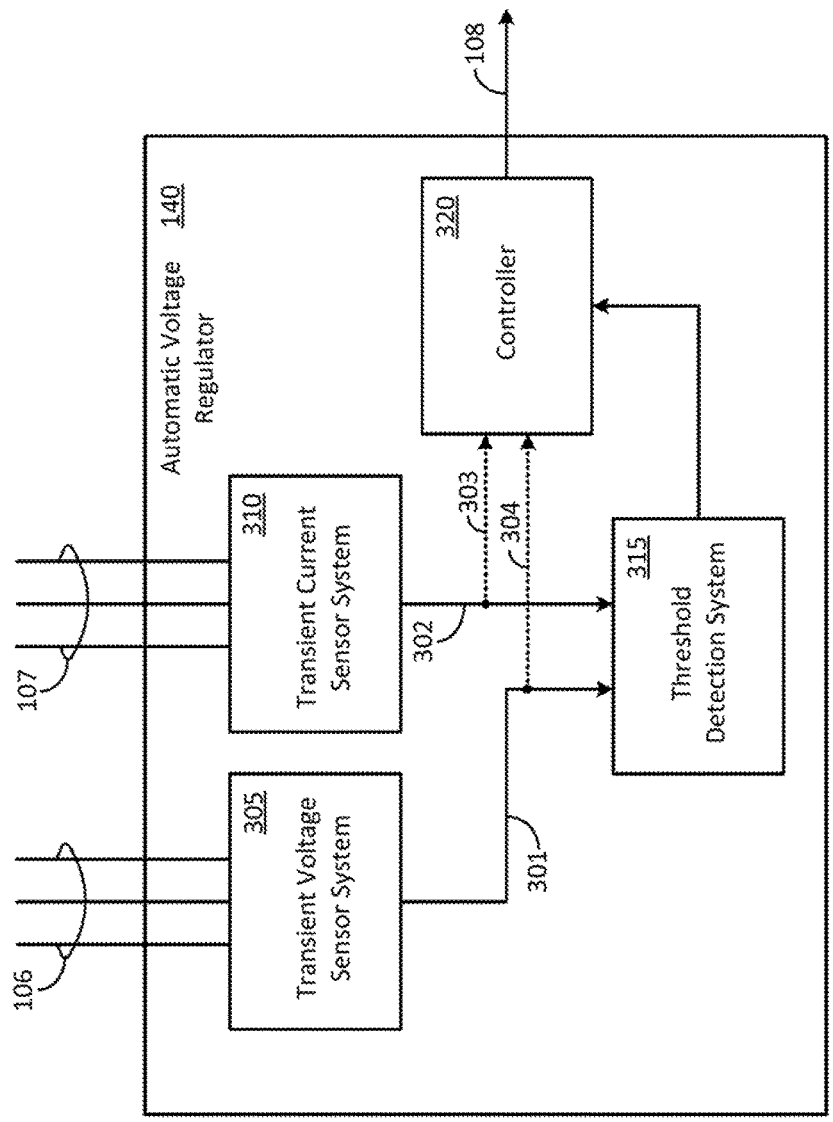

FIG. 3 illustrates some example components of an automatic voltage regulator that can be included in a transient event mitigating system in accordance with an exemplary embodiment of the disclosure.

Figure 4:
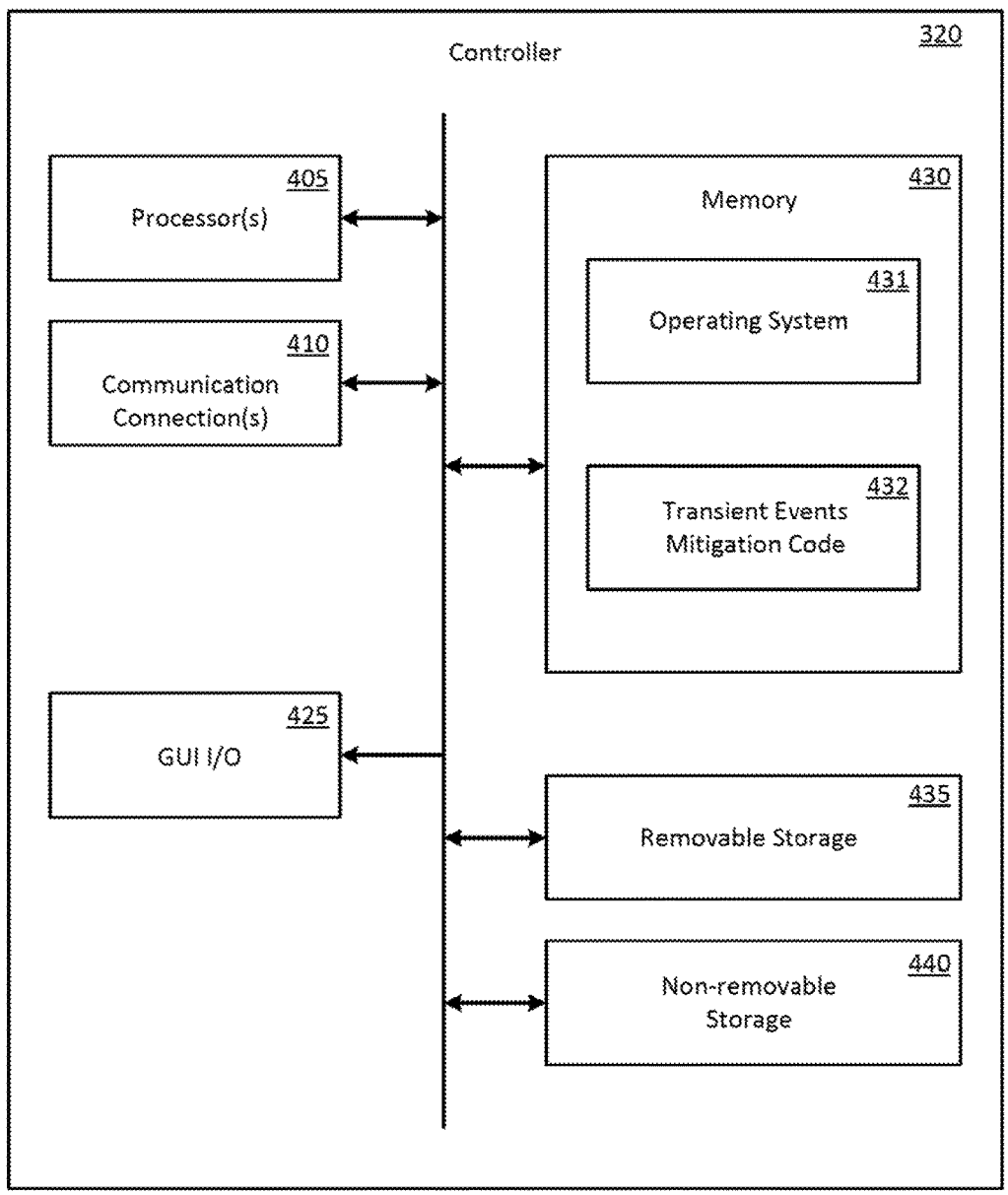

FIG. 4 illustrates a computer that can be used to execute some computational aspects of the transient event mitigating system in accordance with an exemplary embodiment of the disclosure.

The disclosure will be described more fully hereinafter with reference to the drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. Furthermore, the word "example" as used herein is intended to be non-exclusionary and non-limiting in nature. More particularly, the word "exemplary" as used herein indicates one among several examples, and it should be understood that no undue emphasis or preference is being directed to the particular example being described.

DETAILED DESCRIPTION

In terms of a general overview, certain embodiments described in this disclosure pertain to an exemplary transient event mitigating systems and methods that can be incorporated into a power generation system. In one embodiment, the power generation system can include an exciter coupled to an alternating current (AC) generator that provides electric power to power lines. The transient event mitigating system can include an automatic voltage regulator that detects a transient event in one or more of the power lines and configures a power converter to respond to the transient event by increasing an amount of direct current (DC) voltage coupled into the power converter. The power converter can provide the increased DC voltage to an exciter coil of the exciter for a transitory period of time in order to adjust the electric power generated by the AC generator and mitigate or eliminate one or more adverse effects associated with the transient event.

Attention is now drawn to FIG. 1, which illustrates a power generation system 100 that incorporates a transient event mitigating system in accordance with an exemplary embodiment of the disclosure. The transient event mitigating system can contain various elements that are coupled to, and/or located in, a power converter 145 and/or an automatic voltage regulator 140. These elements are described below in more detail. The power generation system 100 can include a gas turbine 120 having a compressor 121 coupled to a turbine 122. The compressor 121 provides pressurized air to a combustor (not shown). In the combustor, pressurized air is mixed with fuel and the mixture ignited to produce hot combustion gases. The hot combustion gases flow downstream to one or more turbine rotors of the turbine 122 that extracts energy from the hot combustion gases and provides a rotational output that can be used for a variety of tasks, such as for generating electric power in a generator 125. The generator 125 includes a rotor that spins in a magnetic field that can be produced by using a set of field coils. The field coils require current flow to generate the magnetic field and will not operate without current flow. An exciter 130 that is coupled to the generator 125, provides the current flow and can include an exciter coil. The exciter coil is provided power by a power converter 145. The power converter 145 varies the amount of power provided to the exciter coil in response to loading conditions upon a set of power lines 105. For example, when a transient event occurs on one or more of the set of power lines 105, the power converter 145 boosts the amount of power provided to the exciter coil for a transitory period of time, thereby increasing the excitation voltage provided by the exciter 130 to the generator 125 and compensating for the abrupt power demand being imposed upon the generator 125. This aspect will be described below in more detail.

The electric power generated by the generator 125 is coupled via a transformer 110 into the set of power lines 105 (for example, three power lines of a three-phase electrical power grid). A set of voltage couplers 115 can be used to sense voltages in the electric power provided by the generator 125 to the transformer 110. The sensed voltages can be coupled into the automatic voltage regulator 140 via a transformer 135 and an associated set of lines 106. A set of current sensors 116 can be used to sense currents propagating through the power lines between the generator 125 and the transformer 110. The sensed currents can be coupled into the automatic voltage regulator 140 via a set of lines 107.

The automatic voltage regulator 140, which can include some elements of the transient event mitigating system, generates one or more control signals, such as a first control signal that is provided to the power converter 145 via a line 104 and a second control signal that is provided to a switch 160 via a line 108. The switch 160 can be selected on the basis of various criteria. For example, in some implementations, the switch 160 can be a metallic switch (relay, contactor etc.) selected for its power handling capacity, while in other implementations, the switch 160 can be a solid-state switch selected for its fast switching speed. The second control signal can be generated by the automatic voltage regulator 140 upon detecting a transient event in one or more power lines in the set of power lines 105. Further details pertaining to the automatic voltage regulator 140 are provided below.

The power converter 145 can use an AC power source 150 that provides an AC voltage to the power converter 145 via a line 102. The power converter 145 can also use a primary DC voltage source in the form of a battery 155 that is coupled to the power converter 145 via a line 103. A secondary voltage source in the form of a battery 165 can be selectively coupled in series with the battery 155 under control of the second control signal that is provided by the automatic voltage regulator 140 to the switch 160 via line 108.

The primary DC voltage source in the form of a battery 155 can be used to provide power to the power converter 145 as part of a High Initial Response compliant arrangement in the power generation system 100. Under a default operating condition, a negative terminal of the battery 155 is connected to a ground node via the switch 160. The High Initial Response is an excitation system standard in which an excitation system is deemed compliant under IEEE Standard 421.1 when the excitation system stabilizes in less than 100 ms. In certain conditions, such as when a transient event occurs in one or more power lines in the set of power lines 105, the amount of DC voltage provided by the battery 155 may be inadequate to satisfy a High Initial Response specification. Consequently, the power converter 145 momentarily couples into the exciter 130, a supplemental DC voltage (derived by converting an AC voltage output of the AC power source 150 into DC voltage) in parallel with the DC voltage provided by the battery 155.

In some situations, such as during the occurrence of a transient event in one or more power lines in the set of power lines 105, the amount of DC voltage provided by the battery 155, even when coupled in parallel with the DC voltage derived from the AC power source 150, may be inadequate to satisfy a desired speed of response for stabilizing the power generation system 100. For example, the desired speed of response can be less than or equal to about 50 ms. Consequently, upon detecting the transient event, the battery 165 can be coupled in series with the battery 155 for a short period of time, under control of the second control signal that is provided by the automatic voltage regulator 140 to the switch 160. This operation can be carried out by configuring the second control signal to activate the switch 160 so as to disconnect the negative terminal of the battery 155 from the ground node and connect a positive terminal of the battery 165 to the negative terminal of the battery 155 instead. The negative terminal of the battery 165 remains connected to the ground node. The second control signal is further configured to ensure that the switch 160 reverts to the default operating condition (coupling the battery 155 back to the ground node) after a period of time that can be defined on the basis of one or more transient events. Apriori or posteriori knowledge of various operating conditions of the power generation system 100 can be used to define the period of time for which the battery 165 is coupled in series with the battery 155.

The DC voltages provided by each of the battery 155 and the battery 165 can be defined in various ways. In one exemplary implementation, the DC voltages can be defined based upon the ratings of the power converter 145. Thus, when power converter 145 has a nominal operating DC voltage rating of about 175V, the battery 155 can be selected to provide about 175V DC. The DC voltage provided by the battery 165 can be determined based on one or more of parameters such as a predetermined period of time over which the exciter 130 is boosted during a transient event, an amplitude of a boost voltage supplied to the exciter 130 during the transient event, and a power handling capacity of the power converter 145 to accommodate an increase in the DC voltage provided via line 103. It should be understood that the voltage provided by placing the battery 165 in series with the battery 155 is momentary in nature and is primarily directed at responding to transient events rather than long term loading events on the set of power lines 105. Accordingly, in one exemplary embodiment, the battery 165 can be selected to provide about 125V DC. When combined with the about 175V DC provided by the battery 155, the voltage that is coupled into the power converter 145 (via line 103) equals about 300V DC. In this exemplary embodiment, the automatic voltage regulator 140 is configured to detect a transient event based on for example, about a 5% drop (over about 1 second period of time) in a nominal voltage present on the set of on one or more of the set of power lines 105. The automatic voltage regulator 140 can generate the control signal for activating the switch 160 based on detecting the transient event. Furthermore, in this exemplary embodiment, the about 300V DC can be coupled into the power converter 145 for a period of time that can be user-defined and/or based on various requirements such as a grid code requirement and/or a study requirement.

FIG. 2 illustrates some example components that can be incorporated into the power converter 145 in accordance with some embodiments of the disclosure. The AC voltage provided by the AC power source 150 is coupled via the line 102 into a primary winding of a transformer 205. A full-wave rectifier bridge 210 can be used together with a capacitor 220 to convert the AC voltage present at the secondary winding of the transformer 205 into a first DC voltage output. It should be understood that other voltage rectification elements and configurations that perform AC voltage to DC voltage conversion can be used in place of the full-wave rectifier bridge 210.

The DC voltage provided by the battery 155 is coupled via the line 103 into a rectifier diode 240. The rectifier diode 240 is configured to operate in parallel with the full-wave rectifier bridge 210 by providing a second DC voltage output that is applied across the capacitor 220. The rectifier diode 240 further operates to prevent the first DC voltage output provided by the full-wave rectifier bridge 210 from being back-fed into the battery 155 and adversely impacting the battery 155. The combined DC voltage that is applied across the capacitor 220 is coupled to a set of transistors via a contactor 215. The contactor 215, which defaults to a closed state under normal operating conditions, can be activated by the automatic voltage regulator 140 to prevent the combined DC voltage from being applied to the set of transistors during various abnormal operating conditions. For example, the automatic voltage regulator 140 can activate the contactor 215 to an open condition upon detecting a malfunction that can lead to, or has caused, a shutdown of one or more elements of the power generation system 100.

The set of transistors, each of which can be an insulated-gate bipolar transistor (IGBT), can include a first transistor 225, a second transistor 230, and a third transistor 235. The first transistor 225 can be controlled by the automatic voltage regulator 140 to apply a short between node 216 and node 217 under certain conditions when it is desired to retain the contactor 215 in a closed condition for a short period of time in response to a malfunction in one or more elements of the power generation system 100.

Each of the second transistor 230 and the third transistor 235 can be controlled by the automatic voltage regulator 140 in order to controllably vary an amount of time that the combined DC voltage from the full-wave rectifier bridge 210 and the rectifier diode 240 is coupled into the line 101. Varying the amount of time translates to varying an overall amplitude of the DC voltage provided through the line 101 to the exciter 130, which in turn determines the intensity of the magnetic field generated in the generator 125 due to the exciter 130.

FIG. 3 illustrates some example components that can be incorporated into the automatic voltage regulator 140 in accordance with some embodiments of the disclosure. The example components include a transient voltage sensor system 305. The set of lines 106 provide to the transient voltage sensor system 305, the sensed current levels coupled into the automatic voltage regulator 140 via the transformer 135 (shown in FIG. 1). The transient voltage sensor system 305 can include elements that detect various characteristics of transients such as amplitude, duration, edge transition times, voltage level fluctuations, and current level fluctuations. The transients can be indicative of an occurrence of one or more transient events in one or more of the set of power lines 105.

The automatic voltage regulator 140 can also include a threshold detection system 315 that can be used to determine if one or more components of the transient voltages provided by the transient voltage sensor system 305 (via line 301) to the threshold detection system 315 exceeds a preset threshold. The preset threshold can be set by various human entities, such as an operator of the power generation system 100. The output of the threshold detection system 315 can be provided to a controller 320, which can be used to generate the control signal that is provided to the switch 160 via the line 108 (shown in FIG. 1).

In another example embodiment, the output of the transient voltage sensor system 305 can also be directly coupled (via a line 304) into the controller 320. The controller 320 can use the output of the transient voltage sensor system 305 in lieu of, or in addition to, the output of the threshold detection system 315 for generating the control signal that is provided to the switch 160 via the line 108. In one exemplary embodiment, the control signal that is provided by the controller 320 to the switch 160 via the line 108 (shown in FIG. 1) is a pulse having a pulse width that determines the transitory period of time over which the switch 106 is activated. The pulse can have a fixed pulse width in some cases and an adjustable pulse width in some other cases. When adjustable, the pulse width of the pulse can be selectively varied by the controller 320 based, for example, on one or more characteristics of one or more transient events.

In some example implementations, the controller 320 generates and/or transmits the control signal to the switch 160 after determining that a transient parameter (voltage spike, current spike etc.) is persisting beyond a threshold period of time. The threshold period of time can be selected automatically by the controller 320 and/or by a human entity so as to avoid or otherwise reduce false activations and/or switch chatter of the switch 160.

The automatic voltage regulator 140 can further include a transient current sensor system 310. The set of lines 107 provide to the transient current sensor system 310, the sensed current levels coupled into the automatic voltage regulator 140 from the lines located between the generator 125 and the transformer 110 (shown in FIG. 1). The transient current sensor system 310 can include elements that detect various current-related characteristics of transients when present in one or more of the lines located between the generator 125 and the transformer 110. The threshold detection system 315 can be used to determine if one or more components of the transient currents provided by the transient current sensor system 310 via line 302, to the threshold detection system 315 exceeds a preset threshold.

In another example embodiment, the output of the transient current sensor system 310 can also be provided via a line 303 to the controller 320. The controller 320 can use the output of the transient current sensor system 310 in lieu of, or in addition to, the output of the threshold detection system 315 for generating the control signal that is provided to the switch 160 via the line 108.

FIG. 4 illustrates some example components that can be incorporated into the controller 320 in accordance with one or more exemplary embodiments. In this exemplary embodiment, the controller 320 can include one or more processors, such as the processor 405 that is configured to interact with a memory 430. The processor 405 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 430 and executed by the processor 405.

The memory 430 can be used to store program instructions that are loadable and executable by the processor 405, as well as to store data for use during the execution of these programs. Such data can include data generated in the automatic voltage regulator 140, such as data pertaining to voltage-related and/or current-related transient signals. Depending on the configuration and type of the controller 320, the memory 430 can be volatile (such as random access memory (RAM)) and/or non-volatile (such as read-only memory (ROM), flash memory, etc.). In some embodiments, the memory devices can also include additional removable storage 435 and/or non-removable storage 440 including, but not limited to, magnetic storage, optical disks, and/or tape storage. The disk drives and their associated computer-readable media can provide non-volatile storage of computer-readable instructions, data structures, program modules, and other data. In some implementations, the memory 430 can include multiple different types of memory, such as static random access memory (SRAM), dynamic random access memory (DRAM), or ROM.

The memory 430, the removable storage 435, and the non-removable storage 440 are all examples of non-transitory computer-readable storage media. Such non-transitory computer-readable storage media can be implemented in any method or technology for storage of information such as computer-readable instructions, data structures, program modules or other data. Additional types of non-transient computer storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor 405. Combinations of any of the above should also be included within the scope of non-transient computer-readable media.

Turning to the contents of the memory 430, the memory 430 can include, but is not limited to, an operating system (OS) 431 and transient events mitigating code 432 for implementing one or more computational components of a transient event mitigating system in accordance with various embodiments of the disclosure.

The controller 320 can include one or more communication connections 410 that allows for communication with various devices or equipment capable of communicating with the controller 320. The connections can be established via various data communication channels or ports, such as USB or COM ports to receive connections for cables connecting the controller 320 to various other devices on a network. In one embodiment, the communication connections 410 may include Ethernet drivers that enable the controller 320 to communicate with other devices on the network. The controller 320 can also include a graphical user input/output interface 425 that allows the controller 320 to be coupled to a suitable display through which a human operator can interact with the controller 320.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system comprising:
an alternating current generator comprising an exciter with an exciter coil, the alternating current generator configured to provide power to one or more power lines;
a primary direct current voltage source;
a secondary direct current voltage source;
a switch having a default configuration during which a first output terminal of the primary direct current voltage source is coupled to a ground node via the switch, and an operative configuration during which the secondary direct current voltage source is coupled in series with the primary direct current voltage source to the ground node via the switch;
an automatic voltage regulator configured to detect a transient event occurring on the one or more power lines, and further configured to generate at least one control signal that places the switch in the operative configuration for a transitory period of time, the transitory period of time defined at least in part by a duration of the transient event; and
a power converter configured to couple to the exciter coil, at least one of a first direct current voltage that is provided by the primary direct current voltage source, or a second direct current voltage that is provided by a combination of the primary direct current voltage source coupled in series with the secondary direct current voltage source during the transitory period of time.

2. The system of claim 1, wherein at least one of the primary direct current voltage source or the secondary direct current voltage source is a battery, wherein the first output terminal of the primary direct current voltage source is a negative terminal, and the transient event is originated by one of an application of a load to the one or more power lines or a variation in the load applied to the one or more power lines.

3. The system of claim 2, wherein the transient event is characterized at least in part by one of voltage level fluctuations or current level fluctuations in the one or more power lines during the duration of the transient event.

4. The system of claim 1, wherein the automatic voltage regulator comprises:
at least one of a transient voltage sensor system or a transient current sensor system;
a threshold detection system; and
a controller that generates the at least one control signal by using the threshold detection system and the at least one of the transient voltage sensor system or the transient current sensor system.

5. The system of claim of claim 4, wherein the at least one control signal generated by the controller is a pulse.

6. The system of claim 5, wherein the operative configuration of the switch is facilitated by application of the pulse to the switch, the switch reverting to the default configuration upon removal of the pulse.

7. The system of claim 6, wherein the pulse has a fixed pulse width and the controller generates the pulse having the fixed pulse width by using the threshold detection system and the at least one of the transient voltage sensor system or the transient current sensor system to detect an onset of the transient event.

8. The system of claim 6, wherein the pulse has a variable pulse width and the controller generates the pulse having the variable pulse width by using the threshold detection system and the at least one of the transient voltage sensor system or the transient current sensor system to determine a duration of the transient event.

9. A method comprising:
using an alternating current generator to provide power to one or more power lines, the alternating current generator comprising an exciter with an exciter coil;
coupling to the exciter coil, an excitation voltage provided by a primary direct current voltage source;
detecting a transient event occurring on the one more power lines; and
boosting the excitation voltage for a transitory period of time by coupling a secondary direct current voltage source in series with the primary direct current voltage source, the transitory period of time defined at least in part by a duration of the transient event.

10. The method of claim 9, further comprising:
determining a voltage output level of the secondary direct current voltage source based at least in part on a short-term voltage rating of the exciter coil, the short-term voltage rating of the exciter coil exceeding a sustained operating voltage rating of the exciter coil.

11. The method of claim 9, wherein coupling the secondary direct current voltage source in series with the primary direct current voltage source comprises automatically activating a switch under control of an automatic voltage regulator, the automatic voltage regulator configured to detect the transient event and generate at least one control signal that activates the switch.

12. The method of claim 11, wherein the at least one control signal is generated based on at least one of voltage level fluctuations or current level fluctuations exceeding a threshold level.

13. The method of claim 12, wherein the voltage level fluctuations comprises a series of transient voltage spikes and the current level fluctuations comprises a series of transient current spikes.

14. The method of claim 13, further comprising:
reducing false activations of the switch by generating the at least one control signal based on at least one of the series of transient voltage spikes or the series of transient current spikes exceeding the threshold level and persisting beyond a threshold period of time.

15. A non-transitory computer-readable storage medium with instructions executable by at least one processor for performing operations comprising:
detecting a transient event occurring in one or more power lines, the one or more power lines powered by an alternating current generator that includes an exciter with an exciter coil, the exciter coil provided an excitation voltage by a primary direct current voltage source;
generating at least one control signal upon detecting the transient event; and
boosting the excitation voltage for a transitory period of time by using the at least one control signal to activate a switch and couple a secondary direct current voltage source in series with the primary direct current voltage source.

16. The non-transitory computer-readable storage medium of claim 15, wherein the transitory period of time is defined at least in part by a duration of the transient event.

17. The non-transitory computer-readable storage medium of claim 16, wherein the at least one control signal is a pulse that activates the switch to a first position for coupling the secondary direct current voltage source in series with the primary direct current voltage source, the switch reverting to a second position upon removal of the pulse, the second position constituting a default position of the switch.

18. The non-transitory computer-readable storage medium of claim 17, wherein the pulse has one of a fixed pulse width or a variable pulse width, the pulse having the fixed pulse width generated at least in part by detection of an onset of the transient event, the pulse having the variable pulse width generated at least in part by determining a duration of the transient event.

19. The non-transitory computer-readable storage medium of claim 16, wherein the transient event comprises a series of transient voltage spikes occurring in the one or more power lines, and wherein generating the at least one control signal comprises detecting at least one of the series of transient voltage spikes exceeding a detection threshold.

20. The non-transitory computer-readable storage medium of claim 19, the operations further comprising:

reducing false activations of the switch by generating the at least one control signal when one or more of the series of transient voltage spikes exceeds the detection threshold and persists beyond a threshold period of time.

* * * * *